United States Patent Office 2,974,146
Patented Mar. 7, 1961

2,974,146

3-PIPERIDYL BENZHYDRYL ETHERS

John H. Biel, Milwaukee, Wis., assignor, by mesne assignments, to Lakeside Laboratories, Inc., Milwaukee, Wis., a corporation of Delaware No Drawing. Filed Feb. 24, 1956, Ser. No. 567,446

7 Claims. (Cl. 260—294.7)

This invention relates to chemical compounds and processes of preparing the same. More particularly, this invention is concerned with the production of novel derivatives of 3-hydroxypiperidines.

This application is a continuation-in-part of my copending applicaton Serial No. 389,844, filed November 2, 1953, now abandoned.

According to the present invention there are provided novel 3-piperidyl benzhydryl ethers of the formula

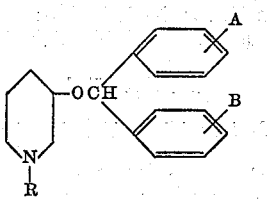

wherein R is hydrogen, a lower alkyl group of up to 8 carbons in the chain, or an alkylaryl group, and A and B are nuclear substituents including hydrogen, halogens such as bromine and chlorine, lower alkyl groups and lower alkoxy groups, and acid addition and quaternary ammonium salts thereof. There are also provided processes of producing such compounds.

The 3-piperidyl benzhydryl ethers may be conveniently produced by reacting an N-acyl-3-hydroxypiperidine with a benzhydryl halide to produce the corresponding N-acyl-3-piperidyl benzhydryl ether. The N-acyl group is subsequently removed by hydrolysis. The process may be represented as follows:

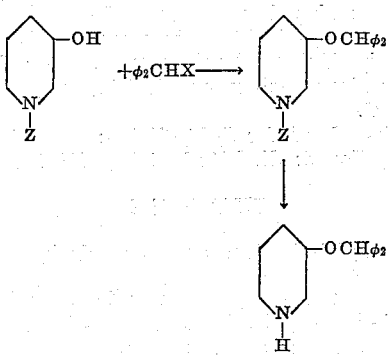

wherein Z is an acyl group, $\phi$ represents a phenyl or substituted phenyl group and X is a halogen, preferably chlorine or bromine.

The reaction of an N-acyl-3-hydroxy piperidine with a benzhydryl halide is conveniently effected under liquid reaction conditions. For the solvent medium inert organic solvents such as toluene, benzene, xylene, hexane and the like may be employed. Approximately equimolar quantities of reactants are employed although this ratio may be varied considerably as desired. The reaction proceeds readily at elevated temperatures and for convenience, the reflux temperature is often employed.

An organic base is incorporated in the reaction mixture initially to bind the hydrohalic acid formed in the reaction and thereby prevent side reactions. From about 1 to 24 hours are generally adequate to substantially complete the reaction.

Once the reaction is terminated the mixture may be filtered and the filtrate distilled to recover the N-acyl-3-piperidyl benzhydryl ether. Removal of the N-acyl group may be achieved by known hydrolytic procedures such as with aqueous or methanolic caustic. Elevated temperatures aid in effecting the hydrolysis. The desired product may be recovered after hydrolysis by the use of conventional separation techniques.

N-acyl-3-hydroxy piperidines may be employed in this process in which the acyl group is derived from mono carboxylic acids, such as the formyl, acetyl, propionyl and benzoyl radicals.

Representative of the benzhydryl halides which may be employed are benzhydryl chloride and benzhydryl bromide as well as nuclear substituted benzhydryl halides in which one or both of the phenyl groups contain the same or different, as well as one or more, substituents, such as halogen, alkyl and alkoxy groups.

Production of the N-substituted-3-piperidyl benzhydryl ethers is achieved by reacting an N-substituted-3-hydroxypiperidine with a benzhydryl halide. This reaction may be represented as follows:

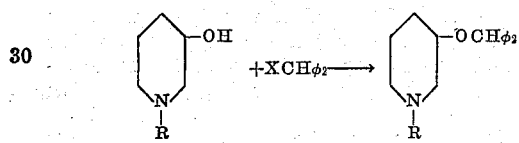

wherein R, X and $\phi$ have the significance previously assigned.

The conditions employed to effect this reaction are essentially those used to make the corresponding compounds in which the N-substituent is an acyl group. However, instead of introducing an extraneous organic base to bind the acid formed in the reaction, an excess, i.e., a one molar excess, may be used if the product is desired directly as the free base.

Typical N-substituted-3-hydroxypiperidines which may be used as reactants are those in which the N-substituent is a lower alkyl such as methyl, ethyl, propyl, butyl, isopropyl and related groups up to and including 8 carbons, and alkylaryl groups in which the alkyl moiety thereof is a lower alkyl such as just named and the aryl moiety is monocyclic, preferably a phenyl group.

Some of the specific compounds provided by this invention which may be listed are 3-piperidyl benzhydryl ether, 3-piperidyl o-chlorobenzhydryl ether, 3-piperidyl o-ethylbenzhydryl ether, 3-piperidyl p-alkoxybenzhydryl ether, N-methyl-3-piperidyl benzhydryl ether, N-ethyl-3-piperidylbenzhydryl ether, N-benzyl-3-piperidylbenzhydryl ether, N-phenethyl-3-piperidylbenzhydryl ether, N-methyl-3-piperidyl p-chlorobenzhydryl ether, N-ethyl-3-piperidyl o-bromobenzhydryl ether and the like.

Acid addition salts of these and related compounds are formed by contacting the 3-piperidyl benzhydryl ethers with a mineral or organic acid such as hydrochloric acid, sulfuric acid, formic acid, acetic acid, citric acid, maleic acid, fumaric acid, phosphoric acid, tartaric acid, benzoic acid, cinnamic acid, succinic acid, mandelic and so forth.

Quaternary ammonium salts are formed by contacting alkyl, aralkyl, alkenyl, alkynyl and aralkenyl esters of mineral and organic acids with the 3-piperidyl benzhydryl ethers, preferably in the presence of an organic solvent. Some compounds which may be reacted with the ethers to form quaternary ammonium salts are methyl bromide, methyl sulfate, benzyl chloride, propargyl bromide, methyl iodide and the like.

The compounds of this invention possess potent sedative properties and many of the compounds surpass in activity recognized sedatives such as phenobarbital. In addition, these compounds prolong the hypnotic effect of barbiturates.

Indications are that these compounds are free of the toxic and habit forming characteristics of barbiturate sedatives.

The quaternary ammonium salts of these compounds also possess potent antispasmodic properties and are, therefore, useful in spastic disturbances of the gastrointestinal tract.

Since both acid addition salts and quaternary ammonium salts are generally soluble in water, they are preferred forms for administration.

The following examples are added to illustrate the preparation of representative compounds provided by this invention, but it is to be understood that the invention shall not thereby be restricted to these specific embodiments of the invention.

EXAMPLE 1

3-piperidyl benzhydryl ether

A mixture containing 21.4 g. (0.15 mole) N-acetyl-3-hydroxypiperidine, 3.45 g. (0.15 mole) of sodium metal and 200 cc. dry toluene was refluxed for two hours. To the above solution was added 30.3 g. (0.15 mole) of benzhydrylchloride and refluxing continued for ten hours. The reaction mixture was clarified by filtration and the filtrate subjected to distillation in vacuo at 86–200° C. (0.04–0.06 mm.). The distillate was hydrolyzed with 100 cc. of 20% methanolic potassium hydroxide in 100 cc. of ethanol by refluxing for 3 hours. The solid impurity, tetraphenylethane, was removed by filtration. The filtrate was concentrated to dryness, the residual oil suspended in water, extracted with ether, ether extract dried with $K_2CO_3$ and then subjected to a fractional distillation in vacuo. The product, 3-piperidyl benzhydryl ether, was collected at 138–141° C. (0.04 mm.), yield 10.5 g. (28.7%).

Analysis.—Calcd. for $C_{18}H_{21}NO$: N, 5.24. Found: N, 4.72.

EXAMPLE 2

3-piperidyl benzhydryl ether fumarate

To 8.3 g. (0.031 mole) of 3-piperidyl benzhydryl ether dissolved in 25 cc. of ethyl alcohol was added 3.6 g. (0.031 mole) of fumaric acid dissolved in 50 cc. of hot ethyl alcohol. The solution was seeded and allowed to stand. After crystallization was complete the solid 3-piperidyl benzhydryl ether fumarate was removed by filtration, yield 6.1 g.; M.P. 168–169° C. dec.

Analysis.—Calcd. for $C_{22}H_{25}NO_5$: N, 3.65. Found N, 3.66. Neutral equivalent: 192. Found: N.E. 189.

EXAMPLE 3

N-methyl-3-piperidyl benzhydryl ether

A mixture of 40.4 g. (0.20 mole) of benzhydryl chloride, 46.0 g. (0.40 mole) of N-methyl-3-hydroxypiperidine and 100 cc. of toluene was refluxed for 24 hours. The insoluble precipitate was removed by filtration and the filtrate subjected to fractional distillation in vacuo. The product N-methyl-3-piperidyl benzhydryl ether was collected at 140–147° C. (0.10 mm.); yield 37 g. (66%).

Analysis.—Calcd. for $C_{19}H_{23}NO$: N, 4.99. Found: N, 5.11.

EXAMPLE 4

N-methyl-3-benzhydryl piperidyl ether fumarate

The compound was prepared from equimolar quantities of the base (Example 3) and fumaric acid in ethanol, M.P. 180° C. dec.

Analysis.—Calcd. for: $C_{23}H_{27}NO_5$: N, 3.52; N.E., 397. Found: N, 3.52; N.E., 400.

EXAMPLE 5

3-piperidyl o-chlorobenzhydryl ether

A mixture containing 28.6 g. (0.20 mole) of 3-hydroxypiperidineacetamide, 47.5 g. (0.20 mole) of o-chlorobenzhydryl chloride, 31.5 g. (0.22 mole) of tri-n-propylamine and 100 cc. of xylene was stirred and refluxed for 24 hours. The reaction mixture was cooled and washed with water, and 100 cc. of 5% aqueous hydrochloric acid. The solvent was removed from the organic phase and the residue distilled, B.P. 184–212° C. (0.45 mm.). The distillate was hydrolyzed in refluxing 20% methanolic potassium hydroxide for 3 hours. The mixture was then concentrated, the residue taken up in water and extracted with ether. The ether extracts were dried with $K_2CO_3$. The product, 3-piperidyl o-chlorobenzhydryl ether, was collected by distillation at 172–174° C. (0.03 mm.); yield 10.6 g. (49%).

Analysis.—Calcd. for $C_{18}H_{20}ClNO$: Cl, 11.77; N, 4.64. Found: Cl, 11.73; N, 4.41.

EXAMPLE 6

3-piperidyl o-chlorobenzhydryl ether fumarate

This salt was prepared from equimolar quantities of the base (Example 5) and fumaric acid in absolute ethanol, M.P. 163–164° C. dec.

Analysis.—Calcd. for $C_{22}H_{24}ClNO_5$: Cl, 8.50; N, 3.35; N.E. 208.8. Found. Cl, 8.66; N, 3.35; N.E. 206.6.

EXAMPLE 7

N-methyl-3-piperidyl o-chlorobenzhydryl ether

A mixture of 46.0 g. (0.40 mole) of N-methyl-3-hydroxypiperidine, 47.2 g. (0.20 mole) of o-chlorobenzhydryl chloride dissolved in 100 cc. of xylene was refluxed for 24 hours. The product, N-methyl-3-piperidyl o-chlorobenzhydryl ether, was collected by fractional distillation in vacuo, B.P. 147–150° C. (0.045 mm.); yield 22.4 g. (35%).

Analysis.—Calcd. for $C_{19}H_{22}ClNO$: Cl, 11.25; N, 4.43. Found: Cl, 12.36; N, 4.04.

EXAMPLE 8

N-methyl-3-piperidyl o-chlorobenzhydryl ether fumarate

To 4.65 g. (0.040 mole) of fumaric acid dissolved in 75 cc. of hot ethanol was added 12.7 g. (0.40 mole) of base (Example 7) in 25 cc. of ethanol. The solid, N-methyl-3-piperidyl o-chlorobenzhydryl ether fumarate, was isolated by crystallization, yield 14.1 g. (82%); M.P. 189–190° C.

Analysis.—Calcd. for $C_{23}H_{26}ClNO_5$: Cl, 8.21; N, 3.24; N.E. 216. Found: Cl, 8.39; N, 3.26; N.E. 215.

EXAMPLE 9

N-methyl-3-piperidyl p-chlorobenzhydryl ether

This compound was prepared in 73% yield from N-methyl-3-hydroxypiperidine and p-chlorobenzhydryl chloride according to the directions described in Example; B.P. 170–173° C. (0.025 mm.).

Analysis.—Calcd. for $C_{19}H_{22}ClNO$: Cl, 11.25; N, 4.45. Found: Cl, 11.25; N, 4.45.

EXAMPLE 10

N-methyl-3-piperidyl p-chlorobenzhydryl ether fumarate

This fumarate salt was prepared from the base (Example 9) and fumaric acid according to the directions described in Example 8; M.P. 183–184° C.

Analysis.—Calcd. for $C_{23}H_{26}ClNO_5$: N, 3.24. Found: N, 3.26.

EXAMPLE 11

*N-methyl-3-piperidyl benzhydryl ether and its hydrochloride and methobromide salts*

A mixture of 18 g. (0.09 mole) of benzhydryl chloride, 10.2 g. (0.09 mole) of N-methyl-3-hydroxylpiperidine and 10 g. (0.10 mole) triethylamine in 100 cc. of benzene was refluxed for one week. The reaction mixture was filtered and the filtrate distilled. N-methyl-3-piperidyl benzhydryl ether was collected at 150–157° C. (0.05 mm.); yield 7 g. (28%).

*Analysis.*—Calcd. for $C_{19}H_{23}NO$: N, 4.95. Found: N, 5.24.

The basic ether was converted to its hydrochloride by the addition of ethereal HCl and the product collected by filtration: M.P. (dec.) 70° C.

*Analysis.*—Calcd. for $C_{19}H_{24}ClNO$: Cl, 11.19; N, 4.41. Found: Cl, 11.95; N, 4.29.

A portion of the basic ether obtained as above was mixed with an equimolar amount of methyl bromide in isopropyl alcohol and the product collected by filtration; M.P. 186–187° C.

*Analysis.*—Calcd. for $C_{20}H_{26}BrNO$: Br, 21.27; N, 3.72. Found: Br, 21.37; N, 3.89.

By following this procedure with the appropriate reactants there was formed N-ethyl-3-piperidyl benzhydryl ether and its hydrochloride and methobromide salts.

Various changes and modifications of the invention can be made and, to the extent that such variations incorporate the spirit of this invention, they are intended to be included within the scope of the appended claims.

What is claimed is:

1. A compound of the formula

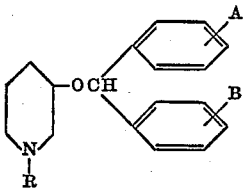

wherein R is a member of the group consisting of hydrogen, lower alkyl, phenyl-lower alkyl, formyl, acetyl, propionyl and benzoyl, and A and B are members of the group consisting of hydrogen, halogen, lower alkyl and lower alkoxy, and the salts thereof of the group consisting of the hydrochloride, sulfate, formate, acetate, citrate, maleate, fumarate, phosphate, tartrate, benzoate, cinnimate, succinate, mandelate, methyl bromide, methyl sulfate, benzyl chloride, propargyl bromide and methyl iodide.

2. 3-piperidyl benzhydryl ether.
3. N-methyl-3-piperidyl benzhydryl ether.
4. 3-piperidyl o-chlorobenzhydryl ether.
5. N-methyl-3-piperidyl o-chlorobenzhydryl ether.
6. N-methyl-3-piperidyl p-chlorobenzhydryl ether.
7. N-lower alkyl-3-piperidyl benzhydryl ether.

References Cited in the file of this patent

UNITED STATES PATENTS 2,479,843   Knox et al. _____ Aug. 23, 1949

FOREIGN PATENTS 571,227   Germany _____ Feb. 25, 1938

OTHER REFERENCES

Paul et al.: Bull. Soc. Chim., France, 1947, pp. 341–45.

UNITED STATES PATENT OFFICE

CERTIFICATION OF CORRECTION

Patent No. 2,974,146                           March 7, 1961

John H. Biel

It is hereby certified that error appears in the above numbered patent requiring correction and that the said Letters Patent should read as corrected below.

Column 4, lines 62 and 63, for "Example;" read -- Example 7; --; column 5, lines 6 and 7, for "hydroxyl-piperidine" read -- hydroxypiperidine --; column 6, line 8, for "cinnimate" read -- cinnamate --.

Signed and sealed this 25th day of July 1961.

(SEAL)
Attest:

ERNEST W. SWIDER
Attesting Officer

DAVID L. LADD
Commissioner of Patents